United States Patent
Ajami et al.

(10) Patent No.: US 11,965,458 B2
(45) Date of Patent: Apr. 23, 2024

(54) MULTI-MODE ENGINE SYSTEM WITH GAS TURBINE ENGINE AND TURBO-COMPRESSOR

(71) Applicant: Raytheon Technologies Corporation, Farmington, CT (US)

(72) Inventors: Andre M. Ajami, Palm City, FL (US); Ryan W. Hunter, North Palm Beach, FL (US); Javier A. Cue, Palm Beach Gardens, FL (US)

(73) Assignee: RTX CORPORATION, Farmington, CT (US)

(*) Notice: Subject to any disclaimer, the term of this patent is extended or adjusted under 35 U.S.C. 154(b) by 24 days.

(21) Appl. No.: 17/535,128

(22) Filed: Nov. 24, 2021

(65) Prior Publication Data
US 2023/0160339 A1    May 25, 2023

(51) Int. Cl.
| | |
|---|---|
| *F02C 3/13* | (2006.01) |
| *F02C 3/04* | (2006.01) |
| *F02C 5/02* | (2006.01) |
| *F02C 7/32* | (2006.01) |

(52) U.S. Cl.
CPC ............. *F02C 5/02* (2013.01); *F02C 3/04* (2013.01); *F02C 3/13* (2013.01); *F02C 7/32* (2013.01); *F05D 2220/34* (2013.01); *F05D 2240/35* (2013.01); *F05D 2260/213* (2013.01); *F05D 2260/232* (2013.01); *F05D 2260/99* (2013.01)

(58) Field of Classification Search
CPC ...... F02C 3/04; F02C 3/13; F02C 5/02; F02C 7/042; F02C 7/32; F02C 9/20; F05D 2220/34
See application file for complete search history.

(56) References Cited

U.S. PATENT DOCUMENTS

| | | | |
|---|---|---|---|
| 2,460,523 A | 2/1949 | Olov | |
| 2,787,886 A * | 4/1957 | Wood | F02C 7/00 60/39.17 |
| 4,215,550 A | 8/1980 | Dinger | |
| 15,018,354 | 5/1991 | Jean | |
| 2006/0150635 A1* | 7/2006 | Su | F23C 13/02 60/777 |
| 2012/0138737 A1* | 6/2012 | Bruno | B64D 41/00 244/58 |
| 2019/0284949 A1 | 9/2019 | Mischler | |

OTHER PUBLICATIONS

EP search report for EP22209437.7 dated Mar. 28, 2023.

* cited by examiner

*Primary Examiner* — Scott J Walthour
(74) *Attorney, Agent, or Firm* — GETZ BALICH LLC (57) ABSTRACT

An engine system is provided that includes a compressor section, a combustor section, a turbine section, a flowpath and a flow regulator. The combustor section includes a combustion chamber. The flowpath extends sequentially through the compressor section, the combustor section and the turbine section. The flow regulator is configured to open the flowpath between the compressor section and the combustion chamber during a first mode of operation. The flow regulator is configured to at least substantially close the flowpath between the compressor section and the combustion chamber during a second mode of operation.

19 Claims, 7 Drawing Sheets

MULTI-MODE ENGINE SYSTEM WITH GAS TURBINE ENGINE AND TURBO-COMPRESSOR

BACKGROUND OF THE DISCLOSURE

1. Technical Field

This disclosure relates generally to an engine system and, more particularly, to an engine system with a gas turbine engine.

2. Background Information

A gas turbine engine is typically configured for generating thrust and/or power. During operation, the gas turbine engine requires an energy input by way of combusting/burning fuel. By contrast, a turbo-compressor utilizes energy from one gas flow input to compress another gas flow input without requiring an additional energy input. Gas turbine engines and turbo-compressors may be used, but are discrete, in modern engine systems. While these modern engine systems have various benefits, there is still room in the art for improvement.

SUMMARY OF THE DISCLOSURE

According to an aspect of the present disclosure, an engine system is provided that includes a compressor section, a combustor section, a turbine section, a flowpath and a flow regulator. The combustor section includes a combustion chamber. The flowpath extends sequentially through the compressor section, the combustor section and the turbine section. The flow regulator is configured to open the flowpath between the compressor section and the combustion chamber during a first mode of operation. The flow regulator is configured to at least substantially close the flowpath between the compressor section and the combustion chamber during a second mode of operation.

According to another aspect of the present disclosure, another engine system is provided that includes a compressor section, a combustor section, a turbine section, a gas turbine engine and a turbo-compressor. The compressor section includes a compressor rotor. The turbine section includes a turbine rotor. The gas turbine engine includes the compressor section, the combustor section and the turbine section during a first mode of operation. The combustor section is fluidly coupled with and between the compressor section and the turbine section during the first mode of operation. The turbo-compressor includes the compressor rotor and the turbine rotor during a second mode of operation. The turbine section is fluidly decoupled from the compressor section during the second mode of operation.

According to still another aspect of the present disclosure, a method is provided for operating an engine system. During this method, compressed gas is directed from a compressor section to a combustor section. Fuel mixed with the compressed gas is ignited within the combustor section to provide combustion products. The combustion products are directed through a turbine section to drive the compressor section. The compressor section is fluidly decoupled from the turbine section. The compressed gas is directed from the compressor section to a fluid receiver. Second gas is directed from a fluid source into the turbine section to drive a compressor rotor in the compressor section.

The engine system may also include a flow regulator configured to fluidly couple the compressor section with a combustion chamber within the combustor section during the first mode of operation. The flow regulator may be configured to fluidly decouple the compressor section from the combustion chamber during the second mode of operation.

The compressor section, the combustor section and the turbine section may be configured as a gas turbine engine during the first mode of operation.

During the first mode of operation, the combustor section is configured to: receive compressed gas from the compressor section; ignite a mixture of the compressed gas and fuel within the combustion chamber to provide combustion products; and direct the combustion products into the turbine section.

The compressor section and the turbine section may be configured as a turbo-compressor during the second mode of operation.

The combustor section may be operational during the first mode of operation. The combustor section may be non-operational during the second mode of operation.

The compressor section may include a compressor rotor. The turbine section may include a turbine rotor. The turbine rotor may be mechanically coupled to the compressor rotor by a shaft.

The engine system may also include a fluid receiver and a fluid source. The fluid receiver may be configured to receive first gas from the compressor section during the second mode of operation. The fluid source may be configured to direct second gas into the turbine section during the second mode of operation.

The fluid receiver may be configured to receive the first gas from the compressor section during the first mode of operation.

The fluid source may be configured to direct the second gas into the turbine section during the first mode of operation.

The fluid receiver may be configured as or otherwise include a heat exchanger.

The engine system may also include a gas turbine engine which includes the fluid receiver. The gas turbine engine may be discrete from the compressor section, the combustor section and the turbine section.

The fluid receiver may be configured as or otherwise include a reservoir.

The fluid source may be configured as or otherwise include a reservoir.

The fluid source may be configured as or otherwise include a ram air intake.

The engine system may also include a gas turbine engine which includes the fluid source. The gas turbine engine may be discrete from the compressor section, the combustor section and the turbine section.

The compressor section may be configured as or otherwise include an axial flow compressor section. In addition or alternatively, the turbine section may be configured as or otherwise include an axial flow turbine section.

The compressor section may be configured as or otherwise include a radial flow compressor section. In addition or alternatively, the turbine section may be configured as or otherwise include a radial flow turbine section.

The present disclosure may include any one or more of the individual features disclosed above and/or below alone or in any combination thereof The foregoing features and the operation of the invention will become more apparent in light of the following description and the accompanying drawings.

DETAILED DESCRIPTION

Figure 1:
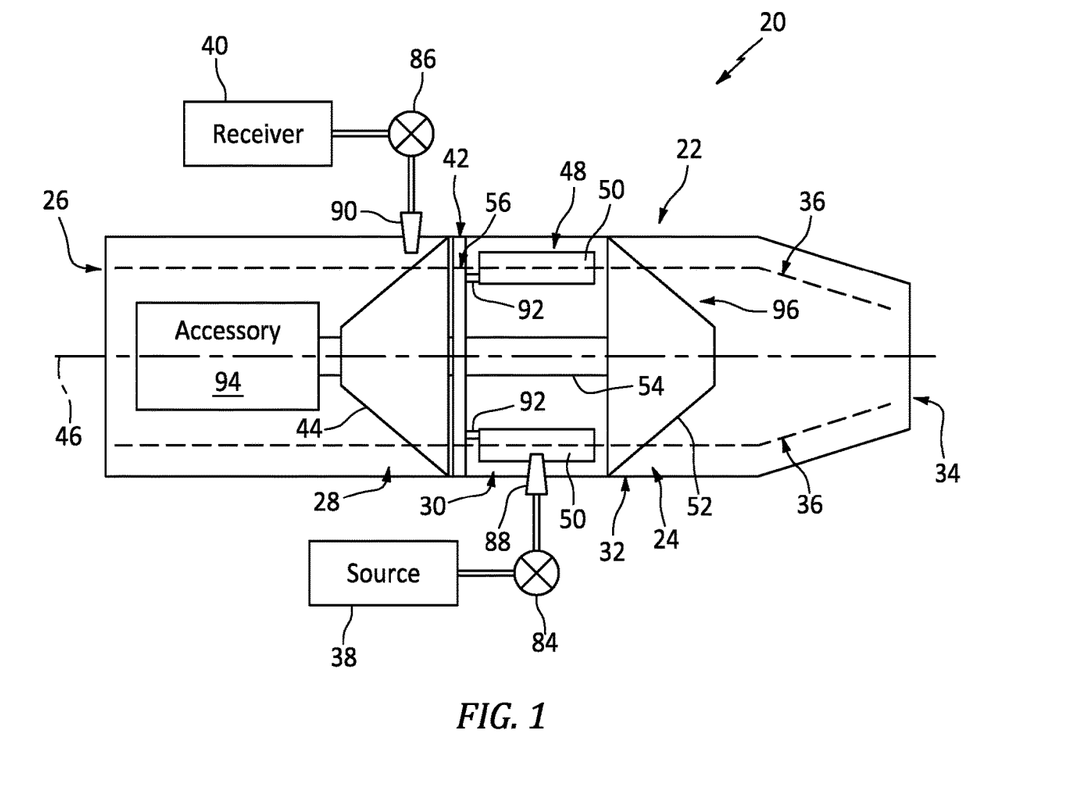
FIG. 1 is a schematic illustration of a multi-mode engine system configured with an axial flow compressor section and an axial flow turbine section.

FIG. 1 illustrates a multi-mode engine system 20. This engine system 20 is configured with a gas turbine engine 22 during a gas turbine engine mode of operation; e.g., see FIG. 2. The engine system 20 is configured with a turbo-compressor 24 during a turbo-compressor mode of operation; e.g., see FIG. 3.

The engine system 20 of FIG. 1 includes an engine inlet 26, a compressor section 28, a combustor section 30, a turbine section 32, an engine exhaust 34 and a (e.g., annular) core flowpath 36 extending sequentially from the engine inlet 26, through the compressor section 28, the combustor section 30 and the turbine section 32, to the engine exhaust 34. This engine system 20 also includes a fluid source 38, a fluid receiver 40 and a flow regulator 42.

The compressor section 28 includes a compressor rotor 44 configured to rotate about a rotational axis 46 of the gas turbine engine 22/the turbo-compressor 24. This compressor rotor 44 includes a plurality of compressor rotor blades arranged circumferentially around and connected to one or more respective compressor rotor disks. The compressor rotor blades are disposed within the core flowpath 36. Each compressor rotor disk is rotatable about the rotational axis 46.

The compressor section 28 may be configured as an axial flow compressor section. The core flowpath 36 of FIG. 1, for example, extends axially along the rotational axis 46 into, within and out of the compressor section 28. The compressor section 28 may alternatively be configured as a radial flow compressor section. The core flowpath 36 of FIG. 4, for example, extends axially along the rotational axis 46 into the compressor section 28. The core flowpath 36 turns radially outward within the compressor section 28. The core flowpath 36 extends radially outwards relative to the rotational axis 46 out of the compressor section 28.

The combustor section 30 of FIG. 1 is fluidly coupled between the compressor section 28 and the turbine section 32. The combustor section 30 includes at least one combustor 48 with an internal combustion chamber 50. The combustor 48 may be configured as an annular combustor which extends circumferentially around the rotational axis 46. The combustor 48 may alternatively be configured as a (e.g., non-annular) CAN-type combustor. In such embodiments, the combustor 48 may be one of a plurality of combustors 48 within the combustor section 30, and the combustors 48 may be distributed circumferentially about the rotational axis 46.

The turbine section 32 includes a turbine rotor 52 configured to rotate about the rotational axis 46. This turbine rotor 52 includes a plurality of turbine rotor blades arranged circumferentially around and connected to one or more respective turbine rotor disks. The turbine rotor blades are disposed within the core flowpath 36. Each turbine rotor disk is rotatable about the rotational axis 46. The turbine rotor 52 of FIG. 1 is mechanically coupled to the compressor rotor 44 through an engine shaft 54.

The turbine section 32 may be configured as an axial flow turbine section. The core flowpath 36 of FIG. 1, for example, extends axially along the rotational axis 46 into, within and out of the turbine section 32. The turbine section 32 may alternatively be configured as a radial flow turbine section. The core flowpath 36 of FIG. 4, for example, extends radially inward relative to the rotational axis 46 into the turbine section 32. The core flowpath 36 turns axially along the rotational axis 46 within the turbine section 32. The core flowpath 36 extends axially along the rotational axis 46 out of the turbine section 32.

The fluid source 38 is configured to provide fluid source gas to the combustor section 30 and its combustor 48. This fluid source gas may be compressed gas and/or high velocity gas. The fluid source 38, for example, may be configured as a reservoir such as a bottle, a tank, a cylinder, a bladder or any other type of pressure vessel. The reservoir, for example, may be configured as an oxygen ($O_2$) bottle. The fluid source 38 may alternatively be configured as (or also include) an intake, which may be discrete from the engine inlet 26. The intake, for example, may be configured as a ram air intake or any other type of forced induction intake. The fluid source 38 may still alternatively be configured as (or also include) an internal combustion (IC) engine which is discrete from the gas turbine engine 22. This IC engine may be a gas turbine engine, and the fluid source gas may be compressed air bled from a compressor section of that gas turbine engine and/or exhaust gas bled or otherwise received from an exhaust of that gas turbine engine. The present disclosure, however, is not limited to the foregoing exemplary fluid source types/configurations.

The fluid receiver 40 is configured to receive compressed gas bled or otherwise received from the compressor section 28. The fluid receiver 40, for example, may be configured as a component of a heat exchanger system; e.g., a heat exchanger. The fluid receiver 40 may alternatively be configured as (or also include) a reservoir for containing/storing the compressed gas for later use. The fluid receiver 40 may still alternatively be configured as (or also include) an internal combustion (IC) engine which is discrete from the gas turbine engine 22. This IC engine may be a gas turbine engine (e.g., a main propulsion system engine), where the compressed gas received from the compressor section 28 may be utilized during, for example, startup of that gas turbine engine.

Figure 5:
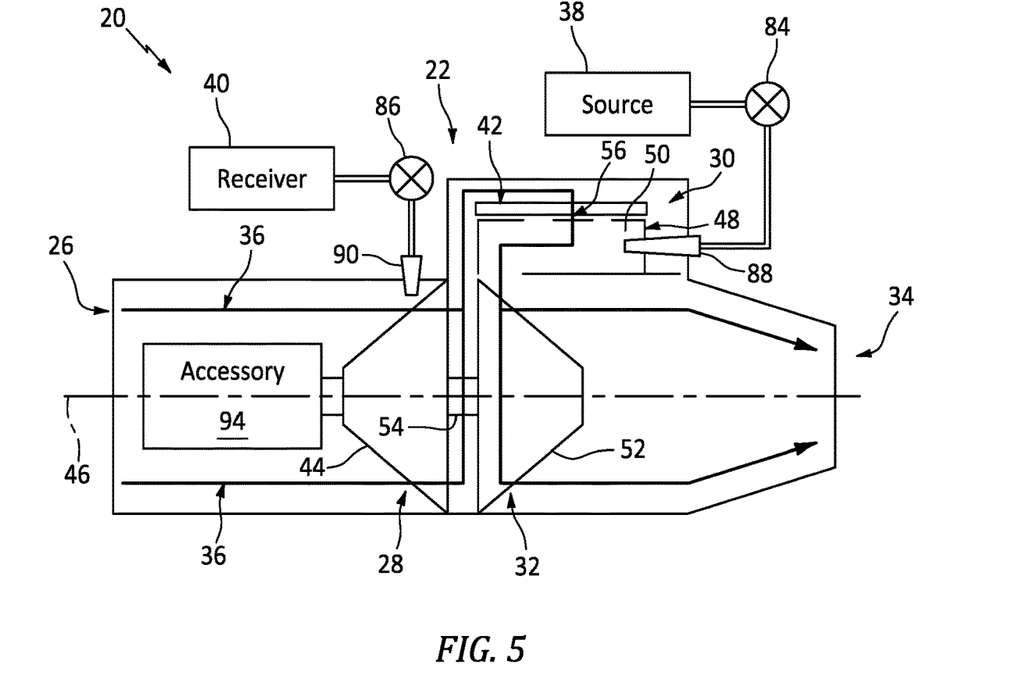
FIG. 5 is a schematic illustration of the engine system of FIG. 4 during a gas turbine engine mode of operation.
Figure 6:
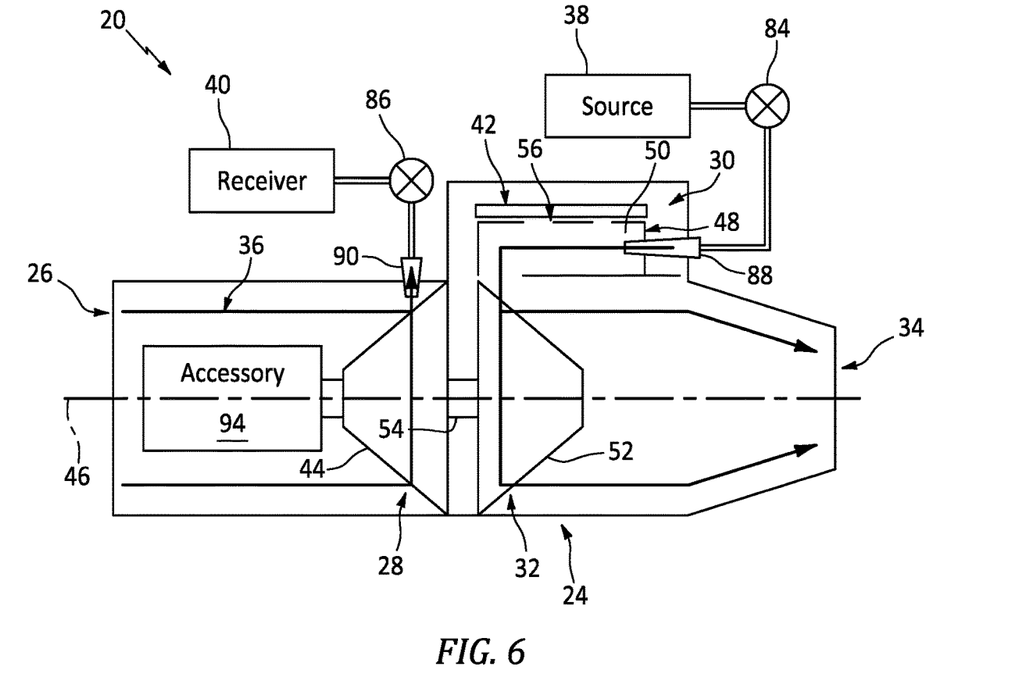
FIG. 6 is a schematic illustration of the engine system of FIG. 4 during a turbo-compressor mode of operation.

The flow regulator 42 is configured to regulate gas (e.g., air) flow through the core flowpath 36 downstream of the compressor section 28/the compressor rotor 44. The flow regulator 42 of FIG. 1, for example, is configured to regulate the gas flow directed through the core flowpath 36 from the compressor section 28 to the combustor 48 and its combustion chamber 50. For example, during the gas turbine engine mode of operation of FIG. 2 (see also FIG. 5), the flow regulator 42 may open (e.g., facilitate flow through) a portion 56 of the core flowpath 36 between the compressor rotor 44 and the combustion chamber 50. The flow regulator 42 may thereby fluidly couple the compressor section 28 with the combustor section 30 and its combustion chamber 50. However, during the turbo-compressor mode of operation of FIG. 3 (see also FIG. 6), the flow regulator 42 may substantially or completely close (e.g., cutoff flow through) the portion 56 of the core flowpath 36 between the compressor rotor 44 and the combustion chamber 50, where the flow regulator 42 may substantially close the portion 56 of the core flowpath 36 by reducing flow therethrough at least, for example, eighty or ninety percent (80-90%). The flow regulator 42 may thereby fluidly decouple the compressor section 28 from the combustor section 30 and its combustion chamber 50.

Figure 7A:
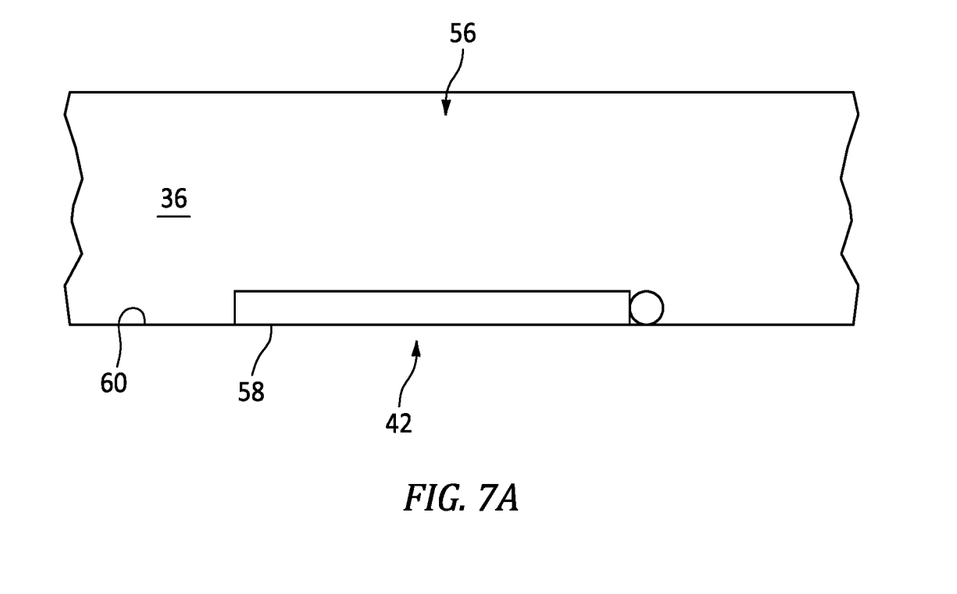
FIGS. 7A and 7B are illustrations of a flow regulator arranged with a flowpath.
Figure 7B:
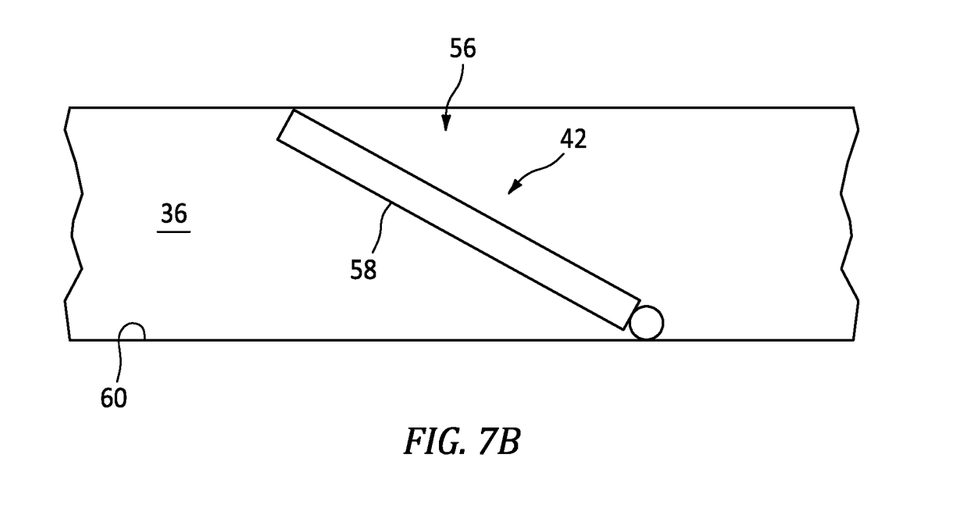

Referring to FIGS. 7A and 7B, the flow regulator 42 may configured as or otherwise include a pivot member 58; e.g., mechanical flap, a door, etc. This pivot member 58 is disposed within the core flowpath 36, and is pivotable about a pivot axis between an open position (see FIG. 7A) and a closed position (see FIG. 7B). In the open position of FIG. 7A, the pivot member 58 may be positioned against a flowpath wall 60 to a side of the core flowpath 36 to facilitate the flow of gas (e.g., compressed air) through the flow regulator 42 and the core flowpath portion 56 during the gas turbine engine mode of operation. In the closed position of FIG. 7B, the pivot member 58 may extend across and substantially or completely block the core flowpath 36 to cut off the flow of gas (e.g., compressed air) through the flow regulator 42 and the core flowpath portion 56 during the turbo-compressor mode of operation.

Figure 8A:
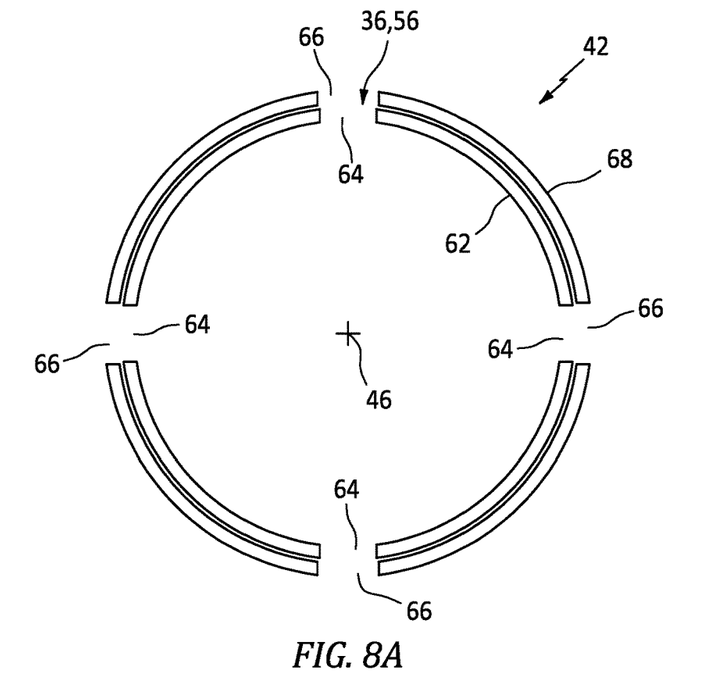
FIGS. 8A and 8B are illustrations of another flow regulator.
Figure 8B:
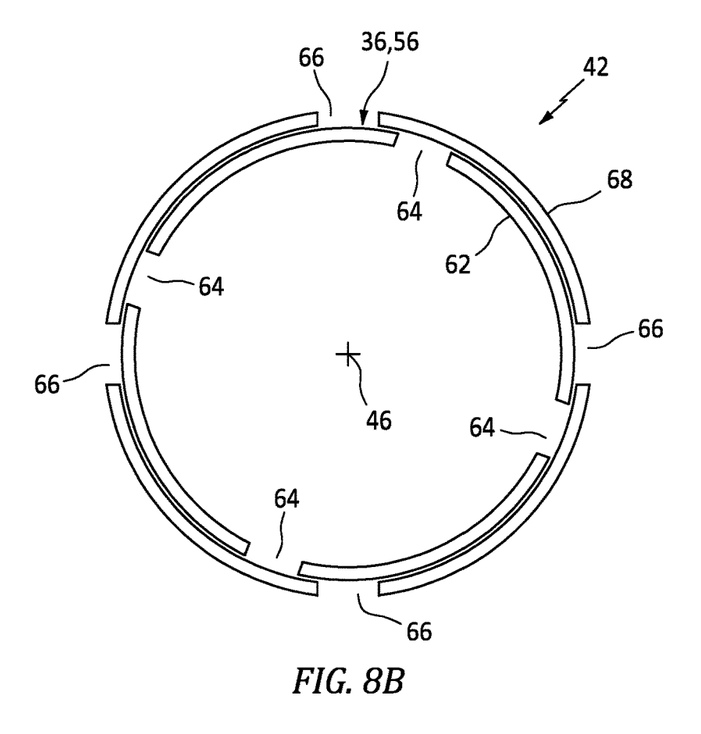

Referring to FIGS. 8A and 8B, the flow regulator 42 may alternatively be configured as or otherwise include a rotatable member 62; e.g., a rotating cylinder. This rotatable member 62 is disposed within the core flowpath 36 (see FIGS. 1 and 4), and is rotatable about an axis (e.g., the rotational axis 46) between an open position (see FIG. 8A) and a closed position (see FIG. 8B). In the open position of FIG. 8A, one or more ports 64 in the rotatable member 62 may be respectively aligned with one or more ports 66 in an adjacent (e.g., stationary) member 68 to facilitate the flow of gas (e.g., compressed air) through the flow regulator 42 and the core flowpath portion 56 (see FIGS. 2 and 5) during the gas turbine engine mode of operation. In the closed position of FIG. 8B, the ports 64 in the rotatable member 62 may be offset from the ports 66 in the adjacent member 68 and the rotatable member 62 may block the ports 66 in the adjacent member 68 to cut off the flow of gas (e.g., compressed air) through the flow regulator 42 and the core flowpath portion 56 (see FIGS. 3 and 6) during the turbo-compressor mode of operation.

FIGS. 7A-8B illustrate various exemplary embodiments of the flow regulator 42. The present disclosure, however, is not limited to such exemplary flow regulator types/configurations. The flow regulator 42, for example, may alternatively be configured as or otherwise include various types of valves. Furthermore, while the flow regulator 42 is described above as moving between a (e.g., fully) open position and a (e.g., fully) closed position, it is contemplated the flow regulator 42 may also move to one or more intermediate positions during the gas turbine engine mode of operation, the turbo-compressor mode of operation and/or another mode of operation to reduce, but not cutoff, gas flow through the flow regulator 42/the core flowpath portion 56 to the combustion chamber 50.

Figures 9A, 9B, 9C:
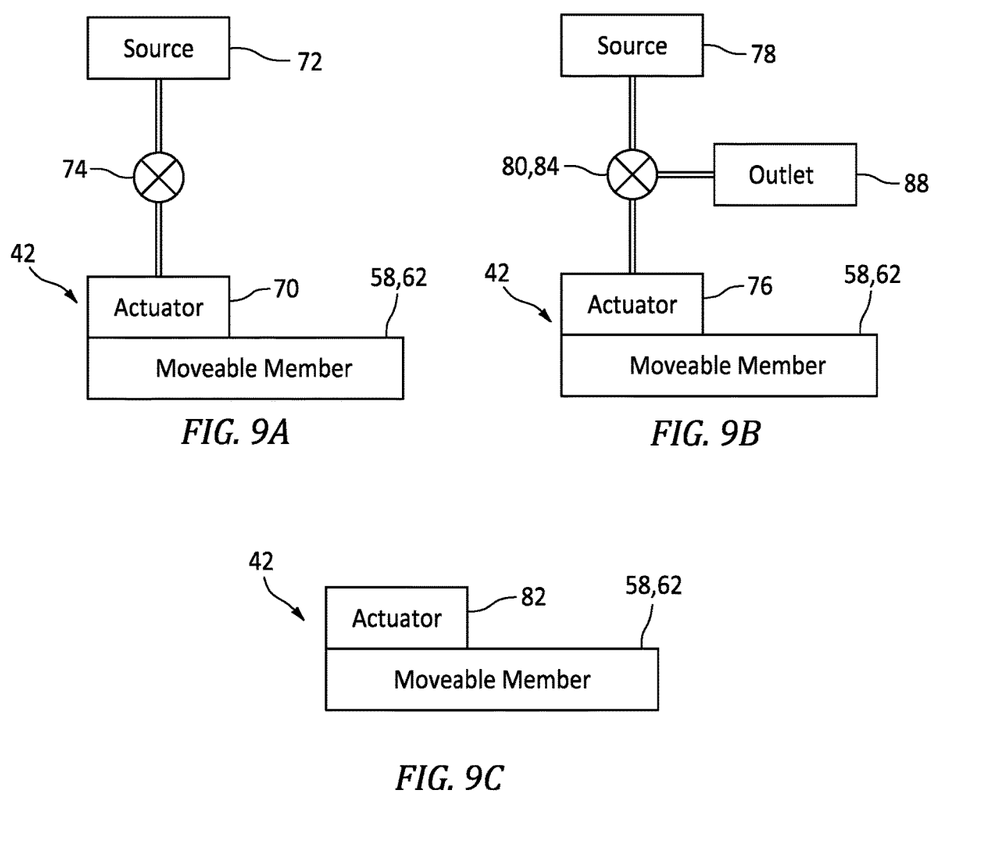
FIGS. 9A-9C are schematic illustrations of various flow regulator actuation configurations.

Referring to FIG. 9A, the flow regulator 42 and its moveable member 58, 62 (see also FIGS. 7A-8B) may be hydraulically actuated. The flow regulator 42 of FIG. 9A, for example, includes a hydraulic actuator 70 (e.g., a hydraulic cylinder) configured to move the moveable member 58, 62 between its open position (e.g., see FIGS. 7A and 8A) and its closed position (e.g., see FIGS. 7B and 8B). This hydraulic actuator 70 may be fluidly coupled to a hydraulic fluid source 72 (e.g., a pump, etc.) through a control valve 74.

Referring to FIG. 9B, the flow regulator 42 and its moveable member 58, 62 (see also FIGS. 7A-8B) may alternatively be pneumatically actuated. The flow regulator 42 of FIG. 9B, for example, includes a pneumatic actuator 76 configured to move the moveable member 58, 62 between its open position (e.g., see FIGS. 7A and 8A) and its closed position (e.g., see FIGS. 7B and 8B). This pneumatic actuator 76 may be fluidly coupled to a pneumatic fluid source 78 (e.g., a compressor, a pressure vessel, etc.) through a control valve 80. The pneumatic fluid source 78 may also be the fluid source 38, or discrete from the fluid source 38.

Referring to FIG. 9C, the flow regulator 42 and its moveable member 58, 62 (see also FIGS. 7A-8B) may alternatively be electrically actuated. The flow regulator 42 of FIG. 9C, for example, includes an electric actuator 82 (e.g., an electric step motor) configured to move the moveable member 58, 62 between its open position (e.g., see FIGS. 7A and 8A) and its closed position (e.g., see FIGS. 7B and 8B).

Figure 10:
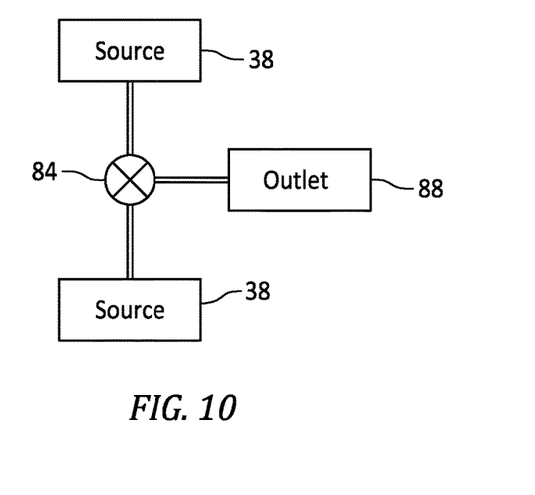
FIG. 10 is a schematic illustration of a fluid source assembly for the engine system.

Referring to FIG. 1, the engine system 20 may include one or more additional flow regulators 84 and 86. The fluid source flow regulator 84 (e.g., at least one valve) is configured to regulate the flow of the fluid source gas from the fluid source 38 to one or more outlets 88 (e.g., injectors) (one visible in FIG. 1). These outlets 88 of FIG. 1 are configured to direct (e.g., inject) the fluid source gas into the combustor 48 and its the combustion chamber 50 during the gas turbine engine mode of operation, the turbo-compressor mode of operation and/or another mode of operation. In some embodiments, referring to FIG. 10, the fluid source flow regulator 84 may also be configured to select which one or more fluid sources 38 (when multiple are available) to fluidly couple to the outlets 88.

Referring again to FIG. 1, the fluid receiver flow regulator 86 (e.g., at least one valve) is configured to regulate the flow of the compressed gas from one or more inlets 90 (e.g., bleed ports) (one visible in FIG. 1) to the fluid receiver 40. These inlets 90 are configured to receive (e.g., bleed and/or redirect) the compressed gas from the compressor section 28 during the gas turbine engine mode of operation, the turbo-compressor mode of operation and/or another mode of operation.

Figure 2:
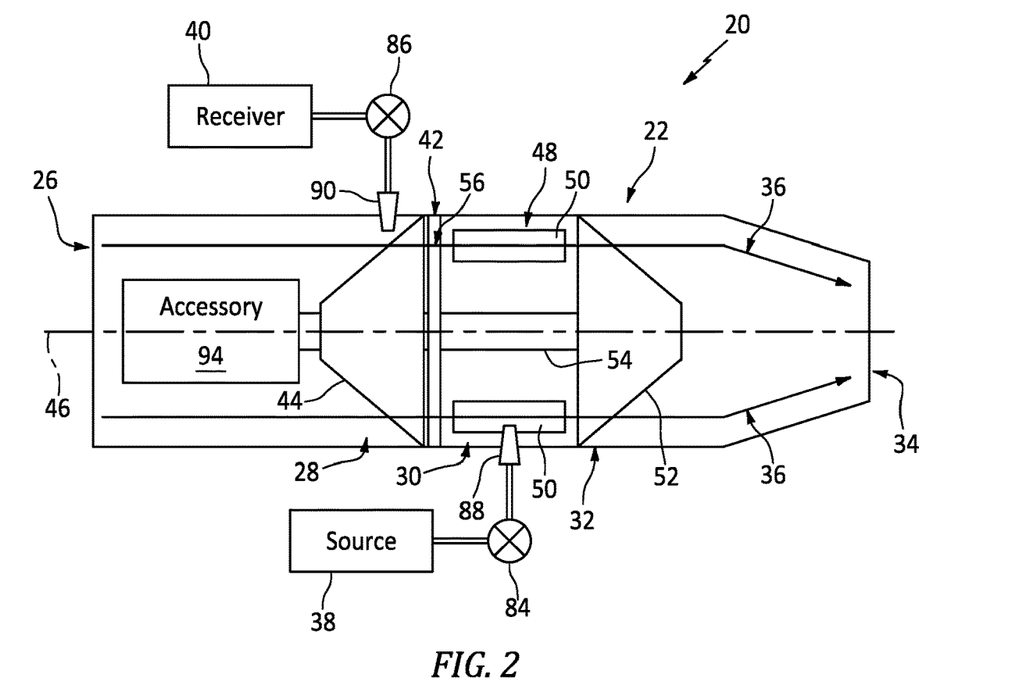
FIG. 2 is a schematic illustration of the engine system of FIG. 1 during a gas turbine engine mode of operation.

During the gas turbine engine mode of operation of FIG. 2 (see also FIG. 5), gas (e.g., air) is directed into the core flowpath 36 through the engine inlet 26. This gas is compressed within the compressor section 28 by the compressor rotor 44 and directed through the flow regulator 42 into the combustor section 30 and its combustion chamber 50. Fuel is injected into the combustion chamber 50 via one or more fuel injectors 92 (see FIGS. 1 and 4), where the fuel is mixed with the compressed gas to provide a gas-fuel mixture. This gas-fuel mixture is ignited within the combustion chamber 50 by one or more igniters to provide combustion products. These combustion products are directed into the turbine section 32 and cause the turbine rotor 52 to rotate. The rotation of the turbine rotor 52 drives rotation of the compressor rotor 44. The combustion products are subsequently exhausted from the gas turbine engine 22 through the engine exhaust 34. These exhausted combustion products may provide engine thrust where, for example, the gas turbine engine 22 is configured as part of a propulsion system for an aircraft. The exhausted combustion products may alternatively be diffused where, for example, the gas turbine engine 22 is configured as part of a power generation system; e.g., an electrical power generator, a hydraulic power system, etc.

Figure 3:
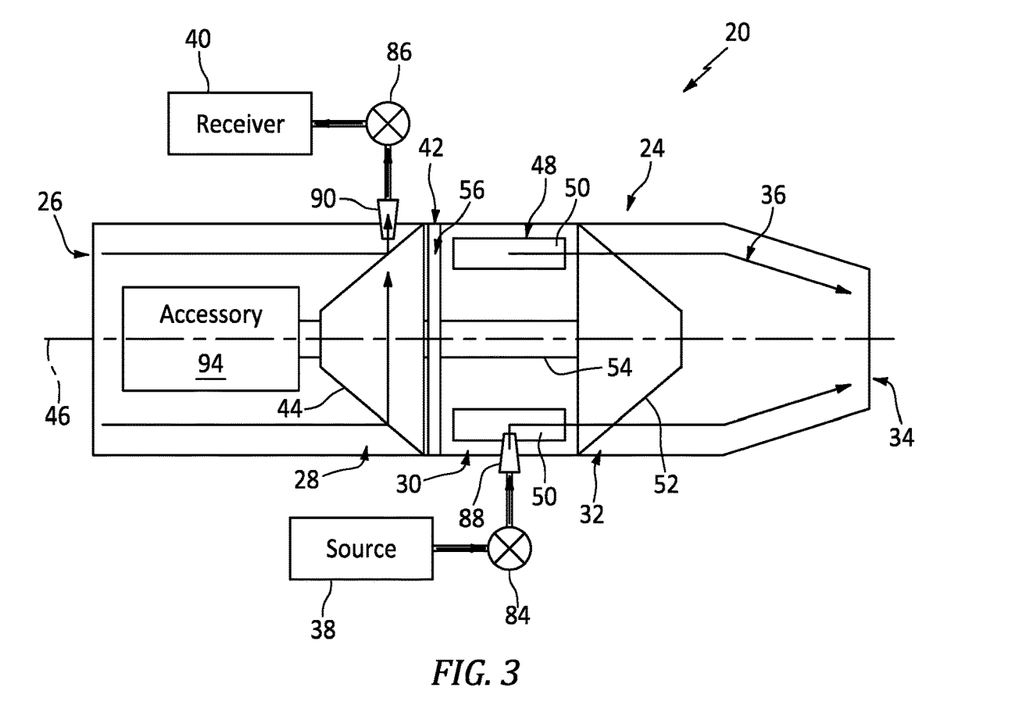
FIG. 3 is a schematic illustration of the engine system of FIG. 1 during a turbo-compressor mode of operation.

During the turbo-compressor mode of operation of FIG. 3 (see also FIG. 6), the fuel flow to the fuel injectors 92 (see FIGS. 1 and 4) is turned off. The flow regulator 42 is also (subsequently, or simultaneously) moved to its closed position to cutoff the flow of the compressed gas from the compressor section 28 to the combustor 48 and its combustion chamber 50. The turbine rotor 52 is thereby no longer rotated by combustion products form the combustion chamber 50. However, the fluid source gas from the fluid source 38 is directed into the flowpath downstream of the closed flow regulator 42 (e.g., within the combustion chamber 50), which fluid source gas flows through the turbine section 32 causing the turbine rotor 52 to rotate. The rotation of the of the turbine rotor 52 drives rotation of the compressor rotor 44. The rotation of the compressor rotor 44 compresses the gas received from the engine inlet 26 to provide the compressed gas. This compressed gas is directed out of the compressor section 28 and the core flowpath 36, upstream of the closed flow regulator 42, to the fluid receiver 40. The turbo-compressor 24 is thereby operable to provide (or maintain) the flow of the compressed gas to the fluid receiver 40 even where the combustor section 30 and, thus, the gas turbine engine 22 are non-operational. This may reduce fuel consumption of the engine system 20. During the turbo-compressor mode of operation, the flow of the compressed gas provided to the fluid receiver 40 may be directly regulated by adjusting (e.g., metering flow through) the fluid receiver flow regulator 86, and/or indirectly regulated by adjusting (e.g., metering flow through) the fluid source flow regulator 84.

In some embodiments, the compressed gas may also be bled from the compressor section 28 and directed to the fluid receiver 40 during the gas turbine engine mode of operation. The fluid source gas may also or alternatively be provided to the combustor section 30 (e.g., directed into the combustion chamber 50) during the gas turbine engine mode of operation. The provision of this fluid source gas may aid in, for example, high altitude startup of the combustor section 30.

Figure 4:
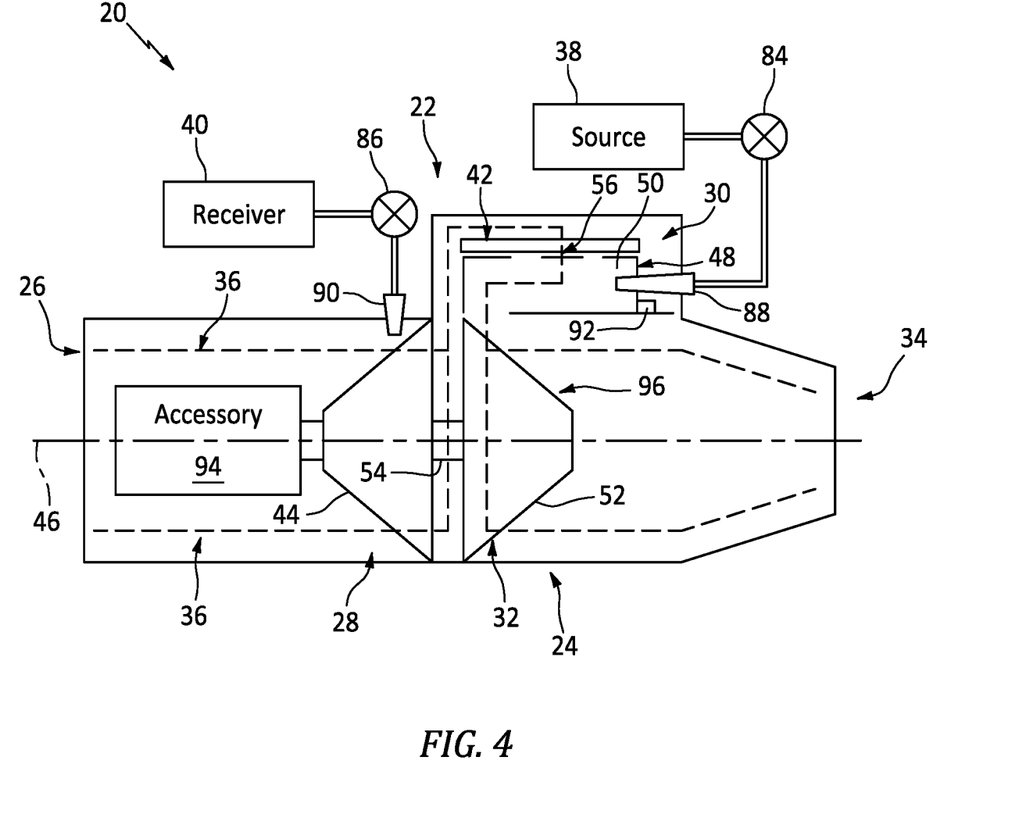
FIG. 4 is a schematic illustration of the engine system configured with a radial flow compressor section and a radial flow turbine section.

In some embodiments, referring to FIGS. 1 and 4, the engine system 20 may include one or more accessories 94 (e.g., shaft mounted accessories) driven by a rotating assembly 96, which rotating assembly 96 may include the compressor rotor 44, the turbine rotor 52 and the engine shaft 54. Examples of the accessories 94 include, but are not limited to, a pump and an electrical generator. Alternatively, the rotating assembly 96 may mechanically drive another apparatus discrete from the gas turbine engine 22.

The gas turbine engine 22 may have various configurations other than the those shown in FIGS. 1-6. The gas turbine engine 22, for example, may be configured as a geared turbine engine where a gear train connects one or more shafts to one or more rotors in a fan section, a compressor section and/or any other engine section. Alternatively, the gas turbine engine 22 may be as a direct drive turbine engine configured without a gear train. The gas turbine engine 22 may be configured with a single spool (see FIGS. 1-6), with two spools, or with more than two spools. The gas turbine engine 22 may be configured as a turbofan engine, a turbojet engine, a turboprop engine, a turboshaft engine, a propfan engine, a pusher fan engine or any other type of turbine engine. The gas turbine engine 22 may alternatively be configured as an auxiliary power unit (APU) or an industrial gas turbine engine.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. An engine system, comprising:
a compressor section comprising a compressor rotor;
a combustor section comprising a combustion chamber;
a turbine section comprising a turbine rotor;
a flowpath extending sequentially through the compressor section, the combustor section and the turbine section;
a flow regulator configured to open a section of the flowpath extending through the compressor section to the combustion chamber during a first mode of operation, the flow regulator configured to at least substantially close the section of the flowpath extending through the compressor section to the combustion chamber during a second mode of operation to limit flow from the compressor section to the combustion chamber, wherein during the second mode of operation a turbine rotor of the turbine section is not rotated by flow provided from the compressor section; and
a fluid source configured to direct gas comprising oxygen into the combustion chamber, during the second mode of operation, independent of the section of the flowpath extending through the compressor section to the combustion chamber.

2. An engine system, comprising:
a compressor section;
a combustor section comprising a combustion chamber;
a turbine section;
a flowpath extending sequentially through the compressor section, the combustor section and the turbine section;
a flow regulator configured to open a section of the flowpath extending through the compressor section to the combustion chamber during a first mode of operation, the flow regulator configured to at least substantially close the section of the flowpath extending through the compressor section to the combustion chamber during a second mode of operation to limit flow from the compressor section to the combustion chamber, wherein during the second mode of operation a turbine rotor of the turbine section is not rotated by flow provided from the compressor section;
wherein the compressor section and the turbine section are configured as a turbo-compressor during the second mode of operation, and the combustor section is non-operational during the second mode of operation; and
a fluid source configured to direct fluid source gas into the combustion chamber, during the second mode of operation, independent of the section of the flowpath extending through the compressor section to the combustion chamber.

3. The engine system of claim 2, wherein the compressor section, the combustor section and the turbine section are configured as a gas turbine engine during the first mode of operation.

4. The engine system of claim 2, wherein, during the first mode of operation, the combustor section is configured to
- receive compressed gas from the compressor section;
- ignite a mixture of the compressed gas and fuel within the combustion chamber to provide combustion products; and
- direct the combustion products into the turbine section.

5. The engine system of claim 2, wherein the combustor section is operational during the first mode of operation.

6. The engine system of claim 2, wherein
- the compressor section comprises a compressor rotor;
- the turbine section comprises a turbine rotor; and
- the turbine rotor is mechanically coupled to the compressor rotor by a shaft.

7. The engine system of claim 2, further comprising a fluid receiver configured to receive compressed gas from the compressor section during the second mode of operation.

8. The engine system of claim 7, wherein the fluid receiver is further configured to receive the compressed gas from the compressor section during the first mode of operation.

9. The engine system of claim 7, wherein the fluid source is further configured to direct the fluid source gas into the turbine section during the first mode of operation.

10. The engine system of claim 7, wherein the fluid receiver comprises a heat exchanger.

11. The engine system of claim 7, further comprising:
- a gas turbine engine comprising the fluid receiver;
- the gas turbine engine discrete from the compressor section, the combustor section and the turbine section.

12. The engine system of claim 7, wherein the fluid receiver comprises a reservoir.

13. The engine system of claim 2, wherein the fluid source comprises a reservoir.

14. The engine system of claim 2, wherein the fluid source comprises a ram air intake.

15. The engine system of claim 2, further comprising:
- a gas turbine engine comprising the fluid source;
- the gas turbine engine discrete from the compressor section, the combustor section and the turbine section.

16. The engine system of claim 2, wherein at least one of
- the compressor section comprises an axial flow compressor section; or
- the turbine section comprises an axial flow turbine section.

17. The engine system of claim 2, wherein at least one of
- the compressor section comprises a radial flow compressor section; or
- the turbine section comprises a radial flow turbine section.

18. The engine system of claim 2, further comprising:
- an accessory rotatably driven by a rotating assembly;
- the rotating assembly including a compressor rotor within the compressor section and a turbine rotor within the turbine section; and
- the accessory comprising a pump or an electric generator.

19. The engine system of claim 18, wherein the accessory comprises the electric generator.

* * * * *